July 19, 1966     B. W. BEDELL     3,261,569
CLIP FOR FISHLINE SPOOLS
Filed Nov. 6, 1963
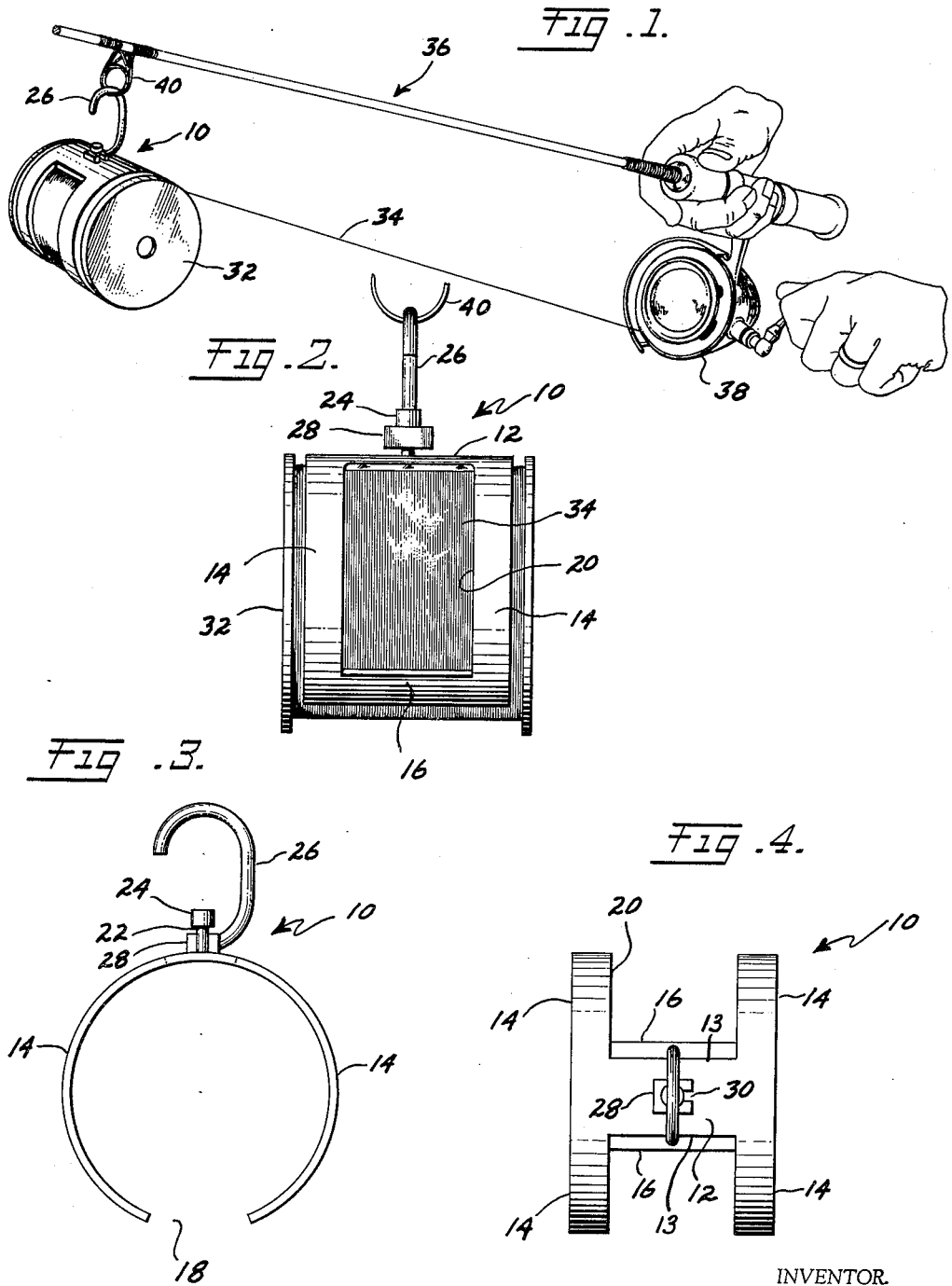
INVENTOR.
BERKLEY W. BEDELL
BY
Meyers & Peterson
ATTORNEYS United States Patent Office 3,261,569
Patented July 19, 1966

3,261,569
CLIP FOR FISHLINE SPOOLS
Berkley W. Bedell, Spirit Lake, Iowa
Filed Nov. 6, 1963, Ser. No. 321,847
3 Claims. (Cl. 242—136)

This invention relates generally to fishing tackle accessories, and pertains more particularly to a clip for suspending a spool of fishline so that the line can be transferred to the reel of a fishing rod.

One object of the invention is to provide a simple device which will assist the fisherman in transferring all or a portion of a fishline from a supply spool to the reel of a fishing rod so that the line can be then used in the normal ordinary manner. More specifically, it is an aim of the invention to provide a resilient clip, preferably of inexpensive plastic or sheet metal, which can be supplied along with a spool of new fishing line, whereby the device can be suspended from the fishing rod itself during the transferring operation.

Another object of the invention is to provide a device of the foregoing character that will function as a detachable retainer when the spool is full, thereby preventing the fishline from inadvertently unwinding.

A further object of the invention is to provide a certain amount of friction on the line as it is unwound so as to prevent overrunning thereof during the transfer procedure.

Another object of the invention is to provide a device that will cause the fishline to be withdrawn from a spool in an optimum direction, the device having an opening having guiding edges so that the line will not be pulled over the ends of the spool. In other words, the fishline is pulled through an opening that guides the line so that it traverses a path involving little or no resistance to its being unwound. Also, it is an aim of the invention to furnish a guiding surface that distributes the paying out of the line in a manner corresponding generally to the way or direction in which the line is originally wound on to the spool.

Yet another object of the invention is to provide a simplified hook arrangement which allows the fisherman to attach the device either to one of the guide eyes or rings on a fishing rod, or to engage a portion of the fishing rod itself, when suspending the spool for transferring line thereon to the fishing rod reel. It is also within the purview of the invention to provide a separate hook that can be readily attached to the clamping device when needed. In this way, the spool can be more compactly packaged. Stated somewhat differently, provision is made for applying the hook to the clip device at the time it is desired to unwind the fishing line, thereby preventing the hook from projecting outwardly from the device and occupying more space than is necessary in the box in which the spool of line is sold.

These and other objects and advantages of the invention will more fully appear from the following description, made in connection with the accompanying drawing, wherein like reference characters refer to the same or similar parts throughout the several views and in which:

FIGURE 1 is a perspective view of the lower portion of a fishing rod showing my device in actual use;

FIGURE 2 is a front elevational view of the device as it appears in FIGURE 1 with the spool of fishline still depicted;

FIGURE 3 is an end view of the device before inserting a spool of line therein, and FIGURE 4 is a top elevational view corresponding to FIGURE 3.

Referring now in detail to the drawing, my device has been designated generally by the reference numeral 10 and will be preferably made of resilient plastic or sheet metal. The device 10 includes a thin strip 12 having spaced parallel edges 13 a pair of oppositely directed, downwardly curved resilient fingers 14 at each end thereof, the lower ends of these fingers being joined together by additional strips 16 extending parallel to the first-mentioned strip 12. As best viewed from FIGURE 3, the lower ends of the fingers 14, and also the strips 16, terminate in a spaced relationship with each other, thereby forming a relatively wide slot 18. Also formed are a pair of side openings 20, the edges bordering these openins being defined by the strip 12, the two pairs of resilient fingers 14, and the additional strips 16.

An upstanding post 22 is integrally affixed at its lower end to the strip 12, and the upper end thereof is formed with an enlarged head 24. A hook 26 having a flat panel or base 28 formed with a slot 30 allows the hook to be conveniently attached to the strip 12. In this regard, it will be appreciated that the slot 30 has a width such as to accommodate or receive the post 22 but is sufficiently narrow so that it underlies the head 24 in actual use.

The device 10 is intended to partially encircle a spool 32 having a supply of fishline 34 wound thereon. As is customary, all or a portion of the line 34 is to be transferred to the reel of a conventional fishrod. The fishrod has been labeled generally by the reference numeral 36 in FIGURE 1 and the reel mounted thereon has been indicated by the reference numeral 38. As is customary, the plurality of guide eyes or rings 40 are spaced along the fishing rod and it is within the purview of the invention to allow the device 10 to be suspended from one of these guide eyes 40 or if desired from the rod 36 itself, the hook 26 being of a size so as to either be inserted through a guide eye 40 or to be placed over the rod.

Having presented the foregoing information, the manner in which my device is employed should be readily apparent. When the user desires to unwind the fishline 34 from the spool 32, he has the choice of connecting the hook 26 to the eye 40, this being the situation that has been pictured, or he can place the hook 26 over a portion of the rod 36. Assuming that the device 10 has been suspended as shown in FIGURE 1, the fisherman need only attach the free end of the fishing line 34 to the reel 38. The spool 32 is free to rotate within the device 10 and in this way the fisherman can easily transfer whatever amount of line is needed from the spool 32 to his reel 38.

It will be recognized that the resilient fingers 14 exert a pressural action on the line 34 as it is being pulled from the spool 32. With this mild amount of restraint, there is never any overrunning of the line as it is payed from the spool and there is therefore no danger of producing a slack which might result in the line becoming entangled. Also, with the line 34 coming through one of the openings 20, there is no chance that the line will be pulled off either end of the spool because the line is guided by the opposed edges of the fingers 14. Further, a good guiding surface is provided by the edge of the strip 12 nearer the user, this edge permitting the line to be unwound in substantially the reverse manner that it was originally wound on to the spool. Little resistance to the unwinding is experienced and the freedom of the line to move back and forth as it is unwound is appreciably enhanced over a situation such as when the line is pulled through a small hole or opening in the box in which it is packaged.

Regarding the packaging of the spool 32, it should be appreciated that the clip device 10 functions as a retainer during the period that the spool is full. Even when the spool is removed from the box in which it is sold, the user need not be concerned about any inadvertent unwinding of the line as the device prevents this. Furthermore, the hook 26 is detachable and can be readily placed in the box or container to conserve space, being applied to the post 22 only when it is desired to transfer the fishline from the spool 32 to the reel 38. Consequently, even though the hook 26 is of an appreciable size, this size does not require a larger package than the spool 32 requires.

The entire device can be made for an extremely low cost and thus does not really add to the price of the spool of fishline.

It will, of course, be understood that various changes may be made in the form, details, arrangements and proportions of the parts without departing from the scope of the invention as set forth in the appended claims.

What is claimed:

1. A device for use in transferring a fishline from a spool to the reel of a fishing rod, the device comprising:
    (a) a clip unit including a transverse strip having a pair of spaced, parallel edges and a pair of oppositely directed, downwardly curved resilient fingers at each end thereof for partially encircling a spool of line, and
    (b) a hook element connected to said strip intermediately of the ends thereof for suspending said clip from a fishing rod.

2. A device for use in transferring a fishline from a spool to the reel of a fishing rod, the device comprising:
    (a) a clip unit including a strip having a pair of oppositely directed, downwardly curved resilient fingers at each end for partially encircling a spool of line,
    (b) a hook element connected to said strip for suspending said clip from a fishing rod, and
    (c) an upstanding post on said strip having an enlarged head thereon,
    (d) said hook element having a flat base residing in a plane perpendicular to the plane of said hook and formed with a slot for receiving said post to effect a connection of said hook to said strip.

3. The device of claim 1 including:
    (a) a pair of strips extending parallel to said first strip for joining the free ends of said fingers together at each side of said clip.

References Cited by the Examiner

UNITED STATES PATENTS

| | | | |
|---|---|---|---|
| 1,524,463 | 1/1925 | Webb | 225—58 |
| 1,554,082 | 9/1925 | Gerould | 242—146 X |
| 2,993,661 | 7/1961 | D'Arrigo | 242—106 |

FOREIGN PATENTS 21,553  1893  Great Britain.

MERVIN STEIN, *Primary Examiner.*

L. D. CHRISTIAN, *Assisant Examiner.*